US009764917B2

(12) United States Patent
Ishizuka

(10) Patent No.: US 9,764,917 B2
(45) Date of Patent: Sep. 19, 2017

(54) SHEET STACKING APPARATUS, CONTROL METHOD OF SHEET STACKING APPARATUS, AND STORAGE MEDIUM

(71) Applicant: CANON KABUSHIKI KAISHA, Tokyo (JP)

(72) Inventor: Koichi Ishizuka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/492,920

(22) Filed: Apr. 20, 2017

(65) Prior Publication Data

US 2017/0217712 A1 Aug. 3, 2017

Related U.S. Application Data

(63) Continuation of application No. 14/552,233, filed on Nov. 24, 2014.

(30) Foreign Application Priority Data

Nov. 28, 2013 (JP) ................................ 2013-245994

(51) Int. Cl.
*G06F 7/00* (2006.01)
*B65H 31/18* (2006.01)
(Continued)

(52) U.S. Cl.
CPC ............. *B65H 31/18* (2013.01); *B65H 43/00* (2013.01); *B65H 43/06* (2013.01); *G03G 15/6529* (2013.01); *B65H 2301/42264* (2013.01); *B65H 2511/152* (2013.01); *B65H 2551/21* (2013.01); *B65H 2801/06* (2013.01)

(58) Field of Classification Search
None
See application file for complete search history.

(56) References Cited

U.S. PATENT DOCUMENTS 4,639,881 A * 1/1987 Zingher .............. B41F 33/0009 345/173
2001/0043827 A1* 11/2001 Shiraishi ............ G03G 15/6538 399/404
(Continued)

FOREIGN PATENT DOCUMENTS

JP 2001322764 A 11/2001
JP 2009203010 A 9/2009
JP 2010189123 A 9/2010

*Primary Examiner* — Yolanda Cumbess
(74) *Attorney, Agent, or Firm* — Canon U.S.A., Inc. IP Division

(57) ABSTRACT

An image forming apparatus includes a display unit, an image forming unit, a detecting unit to detect whether a sheet is on the tray, a moving unit to cause the tray to ascend and to descend to a lower limit position per a tray sheet amount, and a determination unit to determine that tray descent is interrupted at a position located higher than the lower limit position. At the lower limit position, a screen prompting tray sheet removal is displayed. When the tray descent is interrupted, a screen is displayed to include a tray sheet removal prompt and a notice that an obstacle presents under the tray, an image forming process is stopped, and then the tray is caused to ascend when the sheets are not on the tray and then the image forming process is resumed, even if the obstacle presents under the tray.

7 Claims, 10 Drawing Sheets

(51) Int. Cl.
*B65H 43/06* (2006.01)
*B65H 43/00* (2006.01)
*G03G 15/00* (2006.01)

(56) References Cited

U.S. PATENT DOCUMENTS

2003/0155705 A1* 8/2003 Sekiyama ................. B42C 1/12
271/241
2009/0127771 A1* 5/2009 Obuchi .................. B65H 31/12
271/207

* cited by examiner

SHEET STACKING APPARATUS, CONTROL METHOD OF SHEET STACKING APPARATUS, AND STORAGE MEDIUM

CROSS REFERENCE TO RELATED APPLICATIONS

The present application is a continuation of U.S. patent application Ser. No. 14/552,233, filed on Nov. 24, 2014, which claims priority from Japanese Patent Application No. 2013-245994, filed Nov. 28, 2013, all of which are hereby incorporated by reference herein in their entirety.

BACKGROUND OF THE INVENTION

Field of the Invention

The present invention relates to a sheet stacking apparatus, a control method of the sheet stacking apparatus, and a storage medium.

Description of the Related Art

Conventionally, there has been a sheet stacking apparatus that discharges a sheet to an elevatable sheet stacking unit. Such a sheet stacking apparatus prints an image on a sheet, and discharges the sheet having the printed image to the sheet stacking unit through a sheet discharge opening. As illustrated in FIG. 10A, the sheet stacking apparatus can stably stack sheets discharged through the sheet stacking opening, by causing the sheet stacking unit to descend according to an amount of sheets stacked on the sheet stacking unit. In this operation, the sheet stacking apparatus causes the sheet stacking unit to descend so as to bring an uppermost surface of the sheets stacked on the sheet stacking unit to a position near the sheet discharge opening.

As illustrated in FIG. 10B, when an obstacle that interrupts the descending of the sheet stacking unit is present under the sheet stacking unit, the sheet stacking unit hits against the obstacle while descending.

If the sheet stacking apparatus causes the sheet stacking unit to keep descending after hitting against the obstacle, a load is applied to a drive unit which is provided to lower the sheet stacking unit. This may cause damage to the sheet stacking unit and the drive unit.

Therefore, there is a known method of stopping a sheet discharge operation as well as a descending operation of a sheet stacking unit and then displaying a warning message, when the descending operation of the sheet stacking unit is interrupted by an obstacle (see Japanese Patent Application Laid-Open No. 2001-226022).

In the technique discussed in Japanese Patent Application Laid-Open No. 2001-226022, when noticing the displayed warning message, a user calls a serviceperson to lift the warning. The warning cannot be lifted until fixing of the sheet stacking apparatus is completed by the serviceperson.

The user needs to call a serviceperson and wait until maintenance is completed by the serviceperson, even though sheets can be stacked to the extent of not hitting against the obstacle.

SUMMARY OF THE INVENTION

According to an aspect of the present invention, an image forming apparatus includes an image forming unit configured to perform an image forming process for forming an image on a sheet, a discharging unit configured to discharge the sheet having the image formed in the image forming process, a tray on which the sheet discharged by the discharging unit is stacked, a detecting unit configured to detect whether a sheet is on the tray, a moving unit configured to cause the tray to ascend and descend, wherein the moving unit is capable of causing the tray to descend to a lower limit position according to an amount of sheets on the tray, a determination unit configured to determine that descending of the tray by the moving unit is interrupted at a position located higher than the lower limit position, and a display unit configured to display a screen, wherein, in a case that the tray is located at the lower limit position, the display unit is configured to display a first screen prompting a removal of the sheets from the tray, and wherein, in a case that the descending of the tray is determined by the determination unit to be interrupted, the display unit is configured to display a second screen including both an information prompting a removal of the sheets from the tray and an information showing that an obstacle presents under the tray, the image forming unit stops the image forming process, and then the moving unit causes the tray to ascend in response to a detection result of the detection unit that the sheets are not on the tray and, after causing the tray to ascend, the image forming process of the image forming unit is resumed, even if the obstacle presents under the tray.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

<Description of System Configuration>

Figure 1:
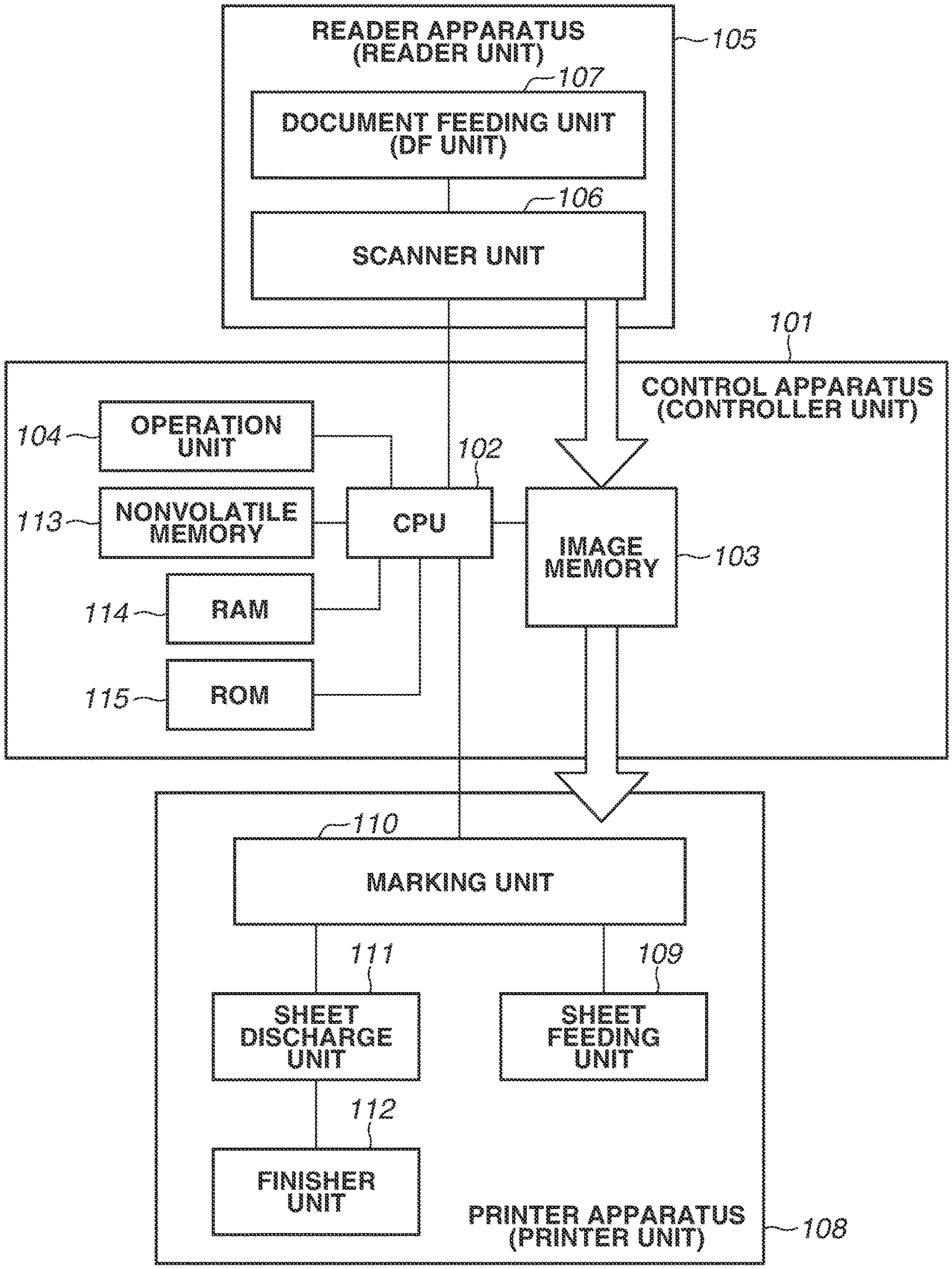
FIG. 1 is a block diagram illustrating a configuration of a printing apparatus (i.e., a multi functional peripheral (MFP)).

FIG. 1 is a block diagram illustrating a configuration of a printing apparatus (i.e., a multi functional peripheral (MFP)) that is an example of a sheet stacking apparatus according to a first exemplary embodiment.

The MFP according to the present exemplary embodiment includes a control apparatus 101, a reader unit 105, and a printer unit 108. In addition, even though the MFP will be described as an example in the present exemplary embodiment, a single functional peripheral (SFP) may be used if this SFP has a printing function similar to that of the printer unit 108. The reader unit 105, the control apparatus 101, and the printer unit 108 are electrically connected to one another, to transmit and receive a control command and data to and from one another. A finisher unit 112 is configured to be attachable to and detachable from the MFP.

The control apparatus 101 includes a central processing unit (CPU) 102, an image memory 103, a nonvolatile memory 113, a random access memory (RAM) 114, a read only memory (ROM) 115, and an operation unit 104.

The CPU 102 controls the entire MFP by reading a program stored in the ROM 115 to the RAM 114 and executing the read program.

The RAM 114 serves as a working area of the CPU 102, and stores various kinds of programs and data.

The ROM 115 stores the various kinds of programs to be read and then executed by the CPU 102.

The image memory 103 stores image data. For example, the image memory 103 stores image data read by the reader unit 105, and image data received from an external personal computer (PC). The image data stored in the image memory 103 is sent to the printer unit 108 according to an instruction from the CPU 102.

The nonvolatile memory 113 serves as a storage unit that holds data without power being supplied. The nonvolatile memory 113 stores various kinds of programs and image data. The nonvolatile memory 113 may be of any type such as a hard disk drive (HDD), a digital versatile disc (DVD), a solid state drive (SSD), and a Blu-ray Disc that have sufficient capacity to store image data. The operation unit 104 includes a display unit and hard keys, to display an operation screen and receive an operation from a user. In addition, the operation unit 104 notifies the user of a state of the MFP and guidance for operating the MFP.

Further, the MFP has a network interface (I/F) (not illustrated). The network I/F enables the MFP to communicate with an external apparatus such as a PC, via a network. Even though a PC will be described as an example of the external apparatus in the present exemplary embodiment, the external apparatus may be of any other type such as another MFP, a portable terminal, and a facsimile machine. Furthermore, in the present exemplary embodiment, an example in which the MFP is connected to the external apparatus via a wired network will be described, but the MFP may be connected to the external apparatus via a universal serial bus (USB) cable. Moreover, the MFP and the external apparatus may be configured to be capable of performing wireless communication such as wireless fidelity (Wi-Fi).

The reader unit 105 includes a scanner unit 106 and a document feeding (DF) unit 107. The scanner unit 106 reads an image of a document and generates image data indicating the read image. The DF unit 107 conveys a document to be read by the scanner unit 106.

The printer unit 108 is a unit to print an image on a sheet (a recording sheet). The printer unit 108 feeds sheets stored in a sheet feeding unit 109 one by one, to a marking unit 110. The sheet feeding unit 109 includes a cassette and a manual feed tray.

The marking unit 110 prints the image on the fed sheet, based on the image data sent from the image memory 103. In addition, an electrophotographic method or an inkjet method may be used for the marking unit 110. Further, any other method may be used as long as an image can be printed.

The printer unit 108 then conveys the sheet on which the image is printed to a sheet discharge unit 111. The sheet discharge unit 111 includes a stacking tray, and discharges the conveyed sheet to the stacking tray. The stacking tray is an example of the sheet stacking unit and may also be referred to as "sheet discharge tray". In addition, even though the present exemplary embodiment will be described using a case in which the CPU 102 directly issues an instruction to a motor driving control unit, the sheet discharge unit 111 may independently have a CPU that controls the sheet discharge unit 111 by exchanging data and commands with the CPU 102.

Next, the configuration of the MFP described above with reference to FIG. 1 will be described in detail with reference to FIG. 2.

Figure 2:
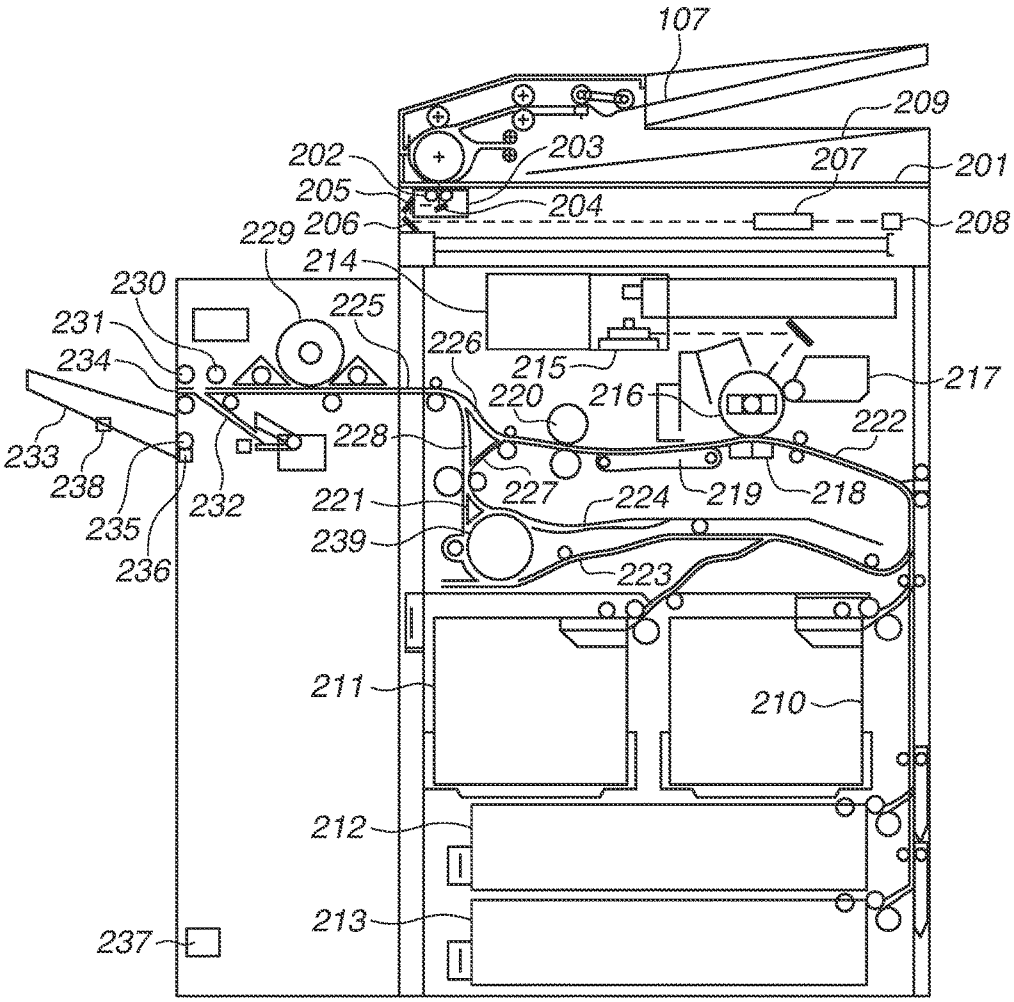
FIG. 2 is a cross-sectional diagram illustrating the configuration of the MFP.

In FIG. 2, the DF unit 107 (a feeder) of the reader unit 105 feeds the document onto a platen glass 201, by conveying documents one by one sequentially from the top. After an operation of reading the document is completed, the fed document is discharged to a document discharge tray 209.

When the conveyed document is conveyed onto the platen glass 201, the reader unit 105 turns on a lamp 202, so that an optical unit 203 exposes the document with light. Then, mirrors 204, 205, and 206 as well as a lens 207 guide reflected light from the document, to a charge coupled device (CCD) image sensor (hereinafter referred to as "CCD") 208. The CCD 208 then reads an image of the document. Image data output from the CCD 208 is transferred to the control apparatus 101, after predetermined processing is performed on the image data.

In addition, the reader unit 105 reads the document placed between the DF unit 107 and the platen glass 201. Then, the reader unit 105 turns on the lamp 202 and moves the optical unit 203. At this time, the mirrors 204, 205, and 206 as well as the lens 207 guide reflected light from the document, to the CCD 208. The CCD 208 then reads an image of the document. Image data output from the CCD 208 is transferred to the control apparatus 101, after predetermined processing is performed on the image data. Even though the CCD 208 reading the image of the document has been described as an example in the present exemplary embodiment, a contact image sensor (CIS) may be used to read the image of the document. When the CIS is used to read the image of the document, the mirrors 204, 205, and 206 as well as the lens 207 are unnecessary, and the CIS is provided at a position of the optical unit 203.

In the printer unit 108, a laser driver 214 drives a laser emitting unit 215. The laser driver 214 causes the laser emitting unit 215 to emit a laser beam according to the image data output from the image memory 103 of the control apparatus 101. A photosensitive drum 216 is irradiated with this laser beam, so that a latent image according to the laser beam is formed on the photosensitive drum 216. A developing unit 217 applies developer so that the developer adheres to a part of the photosensitive drum 216, the part corresponding to the latent image.

Further, the printer unit 108 includes cassettes 210, 211, 212, and 213 each shaped like a drawer and serving as the sheet feeding unit 109. The user can replenish the sheets by pulling out each of the sheet feeding cassettes, placing the sheets in the pulled out cassette, and pushing the cassette back into the printer unit 108. In addition, the printer unit 108 may further include a manual feed tray as the sheet feeding unit 109.

The printer unit 108 performs sheet feeding by extracting the recording sheet (the sheet) from any one of the cassettes 210, 211, 212, and 213 as well as the manual feed tray, and then conveying the extracted sheet to a transfer unit 218 through a conveyance path 222. The transfer unit 218 transfers the developer adhering to the photosensitive drum 216 to the recording sheet. A conveyance belt 219 conveys the recording sheet onto which the developer has been transferred to a fixing unit 220. The fixing unit 220 fixes the developer to the recording sheet by heat and pressure. After passing through the fixing unit 220, the recording sheet is discharged through a conveyance path 226 and then a conveyance path 225. When the recording sheet is to be discharged after being turned over to have a recording surface facing downwards, the recording sheet is guided through a conveyance path 227 and then a conveyance path 239. The recording sheet is conveyed therefrom in the opposite direction to pass through a conveyance path 228 and then the conveyance path 225.

When two-sided recording is set, a flapper 221 guides the recording sheet that has passed through the fixing unit 220 to a conveyance path 224 through the conveyance path 227. The recording sheet is then conveyed in the opposite direction. The flapper 221 then guides the recording sheet to the conveyance path 239 and then to a sheet refeeding conveyance path 223. The recording sheet guided to the sheet refeeding conveyance path 223 is conveyed to the transfer unit 218 through the conveyance path 222 at the above-described timing. Assuming that a surface having the developer transferred first by the transfer unit 218 is a first surface, the transfer unit 218 transfers the developer to a second surface different from the first surface. Then, the recording sheet is guided to the conveyance path 225 through the fixing unit 220. The recording sheet is conveyed to the sheet discharge unit 111 through the conveyance path 225 regardless of whether to perform one-sided recording or two-sided recording.

The recording sheet arriving at the sheet discharge unit 111 is first sent to a buffer unit 229. The buffer unit 229 buffers the conveyed recording sheet by winding this recording sheet around a buffer roller as appropriate. For example, when it is expected to take a long time to perform downstream processing such as stapling, a time interval for conveyance of the recording sheets from a main body can be adjusted by using the buffer unit 229.

This recording sheet then passes through a pair of upstream discharge rollers 230. Next, in a state in which a downstream discharge roller pair 231 pinches a downstream end part of the recording sheet, the direction of the rotation of the downstream discharge roller pair 231 is reversed, so that the recording sheet is placed in a stack tray 232. After one sheet bundle is stacked on the stack tray 232, the stacked sheet bundle is discharged to a stacking tray 233 that is an example of the sheet stacking unit. When shifting is specified by the user, the sheet bundle stacked on the stack tray 232 is discharged to the stacking tray 233 so as to be shifted by 1 cm from a sheet bundle discharged immediately before this sheet bundle. As a result, the user can clearly see a break between sets of sheets. In addition, the sheet bundle may be shifted by a width other than 1 cm. When stapling is specified by the user, the recording sheet is handled as follows. First, the pair of upstream discharge rollers 230 conveys the recording sheet. Subsequently, in a state in which the downstream discharge roller pair 231 pinches the downstream end part of the recording sheet, the direction of the rotation of the downstream discharge roller pair 231 is reversed, so that the recording sheet is stacked on the stack tray 232. Next, a stapling unit performs staple processing on a bundle of the stacked recording sheets. The downstream discharge roller pair 231 then discharges this stapled bundle of the sheets to the stacking tray 233.

The stacking tray 233 is fixed to a belt provided to cause the stacking tray 233 to ascend and descend. This belt is stretched by an upper pulley provided near an upper-end sensor 236 and a lower pulley provided near a lower-end sensor 237. The belt has projections and depressions, and is stretched so that projections and depressions of the upper pulley engage with projections and depressions of the lower pulley. Therefore, when the upper pulley moves, the belt moves according to this movement. An elevating motor 235 is provided to rotate the upper pulley. When the elevating motor 235 is rotated forward or backward according to an instruction from the CPU 102, the belt turns to cause the stacking tray 233 fixed to the belt to ascend or descend. Here, the stacking tray 233 ascends when the elevating motor 235 rotates forward, whereas the stacking tray 233 descends when the elevating motor 235 rotates backward. In addition, the lower pulley may also be configured to move by receiving power from the elevating motor 235.

Further, a height detection sensor 234 is provided above the stacking tray 233. The height detection sensor 234 is a sensor used to measure a distance to the top surface of the stacking tray 233 or a distance to the top surface of the sheet stacked on the stacking tray 233. More specifically, when no sheet is present on the stacking tray 233, the height detection sensor 234 measures the distance to the top surface of the sheet, by emitting an infrared beam to the top surface of the stacking tray 233, and then measuring a detected amount of reflected infrared beam. On the other hand, when a sheet is present on the stacking tray 233, the height detection sensor 234 measures the distance to the top surface of the sheet, by emitting the infrared beam to the sheet stacked on the stacking tray 233, and then measuring a detected amount of reflected infrared beam. The CPU 102 controls the elevating motor 235 to cause the stacking tray 233 to ascend or descend, so as to keep a constant distance to the top surface of the stacking tray 233 or to the top surface of the sheet. In other words, the stacking tray 233 descends or ascends according to an amount of sheets stacked on the stacking tray 233. The stacking tray 233 descends when the sheet is discharged, and the stacking tray 233 ascends after the sheet on the stacking tray 233 is removed. Therefore, the sheet discharge unit 111 causes the stacking tray 233 to ascend or descend by using the elevating motor 235, according to the amount of the recording sheets discharged to and stacked on the stacking tray 233 (sheet amount).

Further, the stacking tray 233 includes a sheet presence detection sensor (not illustrated). The sheet presence detection sensor is a sensor used to detect presence of a sheet placed on the stacking tray 233. The sheet presence detection sensor detects the presence of a sheet on the stacking tray 233, by using a method for detecting that a protruding switch on the stacking tray 233 is pressed down by the weight of the sheet. This switch is sufficiently pressed down even by the weight of one sheet. When a sheet is present on the stacking tray 233, the sheet presence detection sensor transmits a signal indicating the presence of the sheet to the CPU 102. When there is no sheet on the stacking tray 233, the sheet presence detection sensor transmits a signal indicating absence of a sheet to the CPU 102. Based on the signal received from the sheet presence detection sensor, the CPU 102 determines whether a sheet is present on the stacking tray 233.

Meanwhile, the upper-end sensor 236 and the lower-end sensor 237 are provided to detect the position of the stacking tray 233. The CPU 102 recognizes the position of the stacking tray 233 based on a signal from the upper-end sensor 236. More specifically, the CPU 102 determines a state of the stacking tray 233 detected by the upper-end sensor 236, as the stacking tray 233 at an initial position (an upper limit position). The CPU 102 then recognizes the position of the stacking tray 233, based on how many projections are counted from the initial position of the stacking tray 233 by a sensor provided to count projections of the belt to cause the stacking tray 233 to ascend or descend. For example, if the projections among the projections and depressions are provided every 5 mm on the belt, when 50 projections are counted relative to the initial position of the stacking tray 233 as a reference, the CPU 102 recognizes that the stacking tray 233 is at a position lower than the initial position by 250 mm. Alternatively, the CPU 102 may detect the position of the stacking tray 233 by using other method. The CPU 102 may determine a rotation amount of the elevating motor 235 provided to cause the stacking tray 233 to ascend and descend, and may recognize the position of the stacking tray 233 based on the rotation amount determined relative to the initial position of the stacking tray 233 as a reference. For example, if the elevating motor 235 is a stepping motor, the CPU 102 can determine how far the stacking tray 233 is moved (movement amount of the stacking tray 233) from the initial position of the stacking tray 233, based on a product obtained by multiplying a movement amount of the stacking tray 233 per one step by the number of steps (number of pulses) corresponding to rotation. Based on the determined movement amount from the initial position, the CPU 102 can recognize the position of the stacking tray 233. In a case of using a direct current (DC) motor as the elevating motor 235, the CPU 102 can recognize the position of the stacking tray 233, based on a movement amount of the stacking tray 233 determined by a rotation amount of the DC motor.

The lower-end sensor 237 is provided at a lower limit height that is the lowest position to which the stacking tray 233 can descend (a lower limit position). The lower-end sensor 237 detects the stacking tray 233 being present at the lowest position, and informs the CPU 102 of this detection.

An obstacle detection sensor 238 is provided to detect an obstacle present under the stacking tray 233. A distance-measuring sensor can be used as this obstacle detection sensor 238. When the MFP is installed, the CPU 102 moves the stacking tray 233 to the initial position. The CPU 102 then measures a distance from the stacking tray 233 to a floor by using the obstacle detection sensor 238, and stores the measured distance in the nonvolatile memory 113. Afterwards, when the distance to the floor becomes longer than a distance resulting from a change per unit time in ascending or descending of the stacking tray 233, the CPU 102 determines that an obstacle is detected. The obstacle detection sensor 238 may not be necessarily provided.

The MFP having the above-described configuration can execute two or more kinds of jobs.

For example, when the MFP executes a copy job, the MFP reads an image of a document by using the reader unit 105, and generates image data indicating the read image of the document. The MFP then prints an image on a sheet, based on the generated image data and a setting received via the operation unit 104.

Further, when the MFP executes a print job, the MFP analyzes print data received from a PC, and generates image data based on a print setting received from the PC. The MFP then prints an image on a sheet based on the generated image data.

Furthermore, when the MFP executes a fax print job, the MFP receives cord data from an external facsimile machine via a telephone line, and converts the received cord data into image data. The MFP then prints an image on a sheet based on the image data resulting from this conversion.

The MFP receives two or more of these jobs, and sequentially stores the received jobs in the nonvolatile memory 113. The MFP then executes the jobs in the order of being stored in the nonvolatile memory 113.

In the present exemplary embodiment, it has been described that the MFP executes the two or more kinds of jobs, but the present invention is not limited thereto. The MFP may only need to execute part of these two or more kinds of jobs.

Each time a sheet is discharged to the stacking tray 233, the CPU 102 of the MFP causes the height detection sensor 234 to detect the top surface of the sheet, and causes the stacking tray 233 to descend by driving the elevating motor 235. This prevents a sheet discharge failure that may occur when the sheet discharge opening is clogged with the sheet discharged toward the stacking tray 233. In addition, this brings an advantage that it is possible to stack stably the sheets discharged through the sheet discharge opening, by causing the stacking tray 233 to ascend and descend so that the uppermost surface of the sheets comes to a position near the sheet discharge opening. In the present exemplary embodiment, the stacking tray 233 is caused to descend each time a sheet is discharged. However, the stacking tray 233 may descend each time a bundle of two or more sheets are discharged. For example, the stacking tray 233 may descend each time a bundle of ten sheets is discharged.

When an obstacle interrupting a descent of the stacking tray 233 is present under the stacking tray 233 that can ascend and descend as described above, the stacking tray 233 can no longer descend upon hitting against the obstacle. When the stacking tray 233 is caused to keep descending afterwards, a load is applied to the stacking tray 233 and the elevating motor 235, which may cause damage to the stacking tray 233 and the elevating motor 235.

Therefore, when the upper-end sensor 236 detects the stacking tray 233 remaining in the same position even after driving the elevating motor 235, the CPU 102 determines that an obstacle is present under the stacking tray 233. The CPU 102 then stops printing and the descent of the stacking tray 233.

Accordingly, it is possible to prevent damage to the motor 235 and the stacking tray 233 that may occur when the stacking tray 233 is caused to keep descending despite the presence of an obstacle.

Further, in the present exemplary embodiment, even after occurrence of obstacle detection, the CPU 102 causes the stacking tray 233 to start ascending, when detecting removal of the sheet on the stacking tray 233. The CPU 102 then resumes the printing and discharges the sheet to the stacking tray 233. Afterwards, the CPU 102 causes the stacking tray 233 to descend gradually. This can suppress deterioration in productivity.

Next, the control performed by the CPU 102 according to the present exemplary embodiment will be described with reference to flowcharts of FIGS. 3, 4, 6, and 8. In addition, the CPU 102 performs processing in the flowcharts of FIGS. 3, 4, 6, and 8, by reading programs stored in the ROM 115 to the RAM 114 and executing the read programs.

In step S301, when the CPU 102 receives a setting of a copy job from a user via the operation unit 104 and a start key on the operation unit 104 is pressed by the user, the CPU 102 starts print processing for this copy job. In this print processing, the CPU 102 causes the reader unit 105 to read a document and then causes the printer unit 108 to print an image of the read document. Even though the copy job is described as an example here, the job may either be the above-described print job or fax print job as long as the job requires execution of printing.

First, in step S301, the CPU 102 causes the reader unit 105 to read an image of the document, and causes the printer unit 108 to execute the print processing based on image data indicating the read image and the setting of the copy job received via the operation unit 104. After start of the print processing, recording sheets start to be discharged to the stacking tray 233.

In step S302, the CPU 102 controls the stacking tray 233 to descend by driving the elevating motor 235 according to an amount of discharged sheets. Here, the CPU 102 moves the stacking tray 233 by driving the elevating motor 235, to keep a constant distance from the height detection sensor 234 to the top surface of the sheet. Next, in step S303, the CPU 102 determines whether arrival of the stacking tray 233 at a lower end is detected by the lower-end sensor 237. When the CPU 102 determines that the stacking tray 233 has arrived at the lower end (Yes in step S303), the processing proceeds to the flowchart illustrated in FIG. 4. On the other hand, when the CPU 102 determines that the stacking tray 233 has not arrived at the lower end (No in step S303), the processing proceeds to step S304.

In step S304, the CPU 102 determines whether an abnormality is detected while the stacking tray 233 is descending. When the CPU 102 determines that the abnormality is detected while the stacking tray 233 is descending (Yes in step S304), the processing proceeds to step S307. When the CPU 102 determines that the abnormality is not detected while the stacking tray 233 is descending (No in step S304), the processing proceeds to step S305. Here, the abnormality is detected when the descent of the stacking tray 233 is interrupted by an obstacle present under the stacking tray 233, for example. More specifically, there is a case in which the position of the stacking tray 233 detected by the upper-end sensor 236 remains unchanged, even after the elevating motor 235 is driven by the belt in a direction of causing the stacking tray 233 to descend. In this case, the CPU 102 determines that the abnormality is detected while the stacking tray 233 is not descending.

In step S306, the CPU 102 determines whether the execution of the job is completed. When the CPU 102 determines that the execution of the job is not completed (No in step S306), the processing returns to step S301. When the CPU 102 determines that the execution of the job is completed (Yes in step S306), the CPU 102 ends this processing.

When the processing proceeds from step S304 to step S307, the CPU 102 obtains a position of the stacking tray 233 based on a signal from the upper-end sensor 236 in step S307. Next, in step S308, the CPU 102 determines whether the obtained position of the stacking tray 233 is the initial position. Here, when determining that the obtained position of the stacking tray 233 is not the initial position (No in step S308), the CPU 102 determines that the stacking tray 233 is in a tray-full state due to an obstacle, and the processing proceeds to the flowchart illustrated in FIG. 6.

Figure 8:
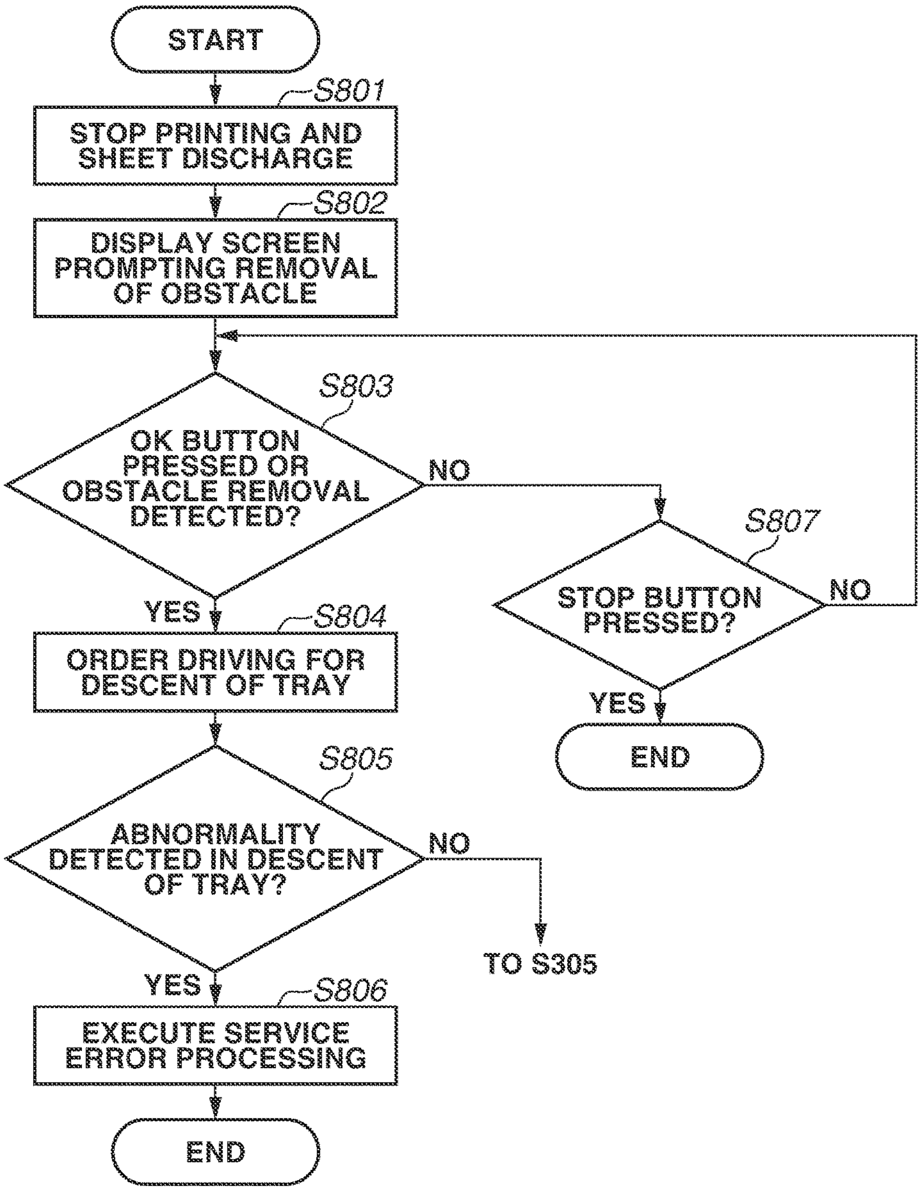
FIG. 8 is a flowchart illustrating the control method performed in the MFP.

On the other hand, when the CPU 102 determines that the obtained position of the stacking tray 233 is the initial position (Yes in step S308), the processing proceeds to the flowchart illustrated in FIG. 8, because it is necessary to remove the obstacle present under the stacking tray 233.

Figure 3:
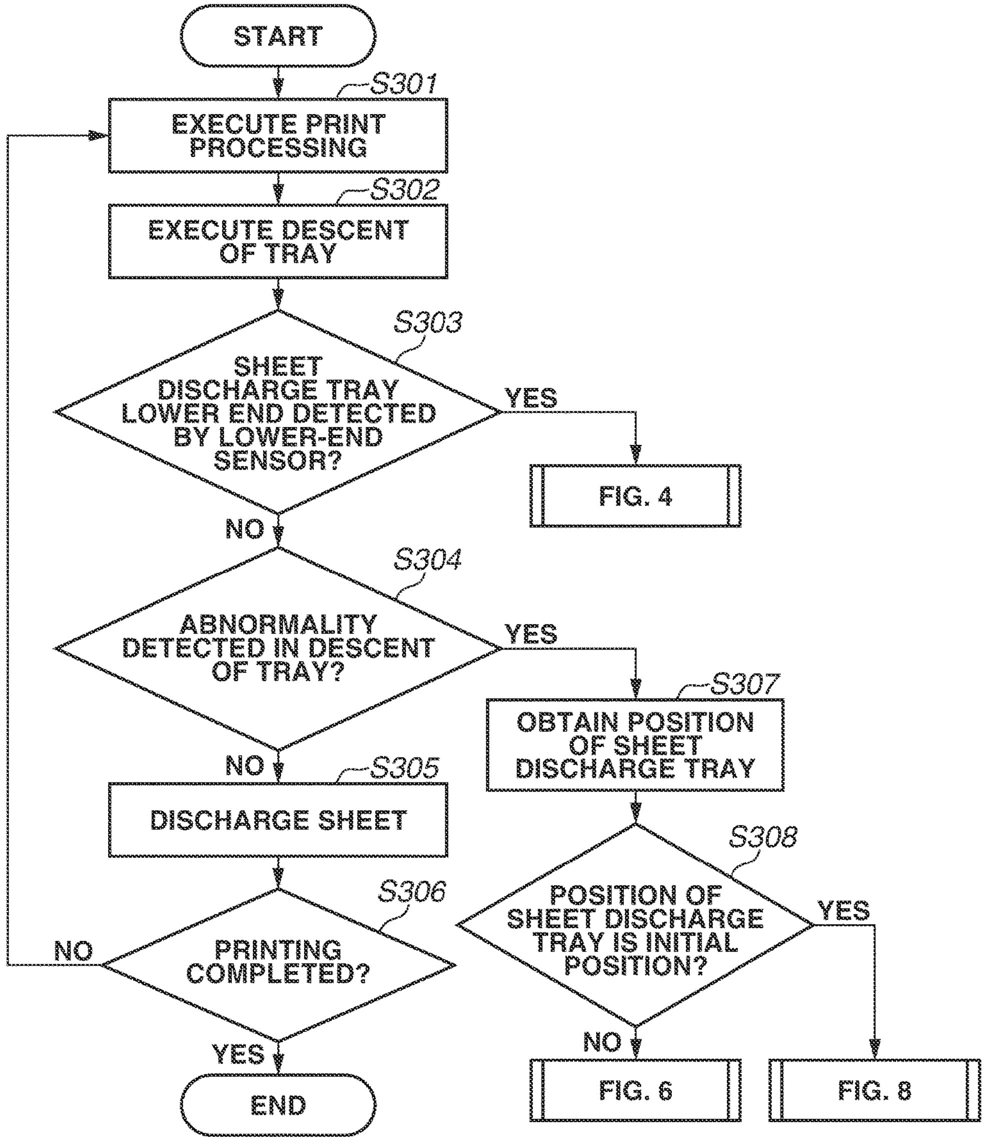
FIG. 3 is a flowchart illustrating a control method performed in the MFP.
Figure 4:
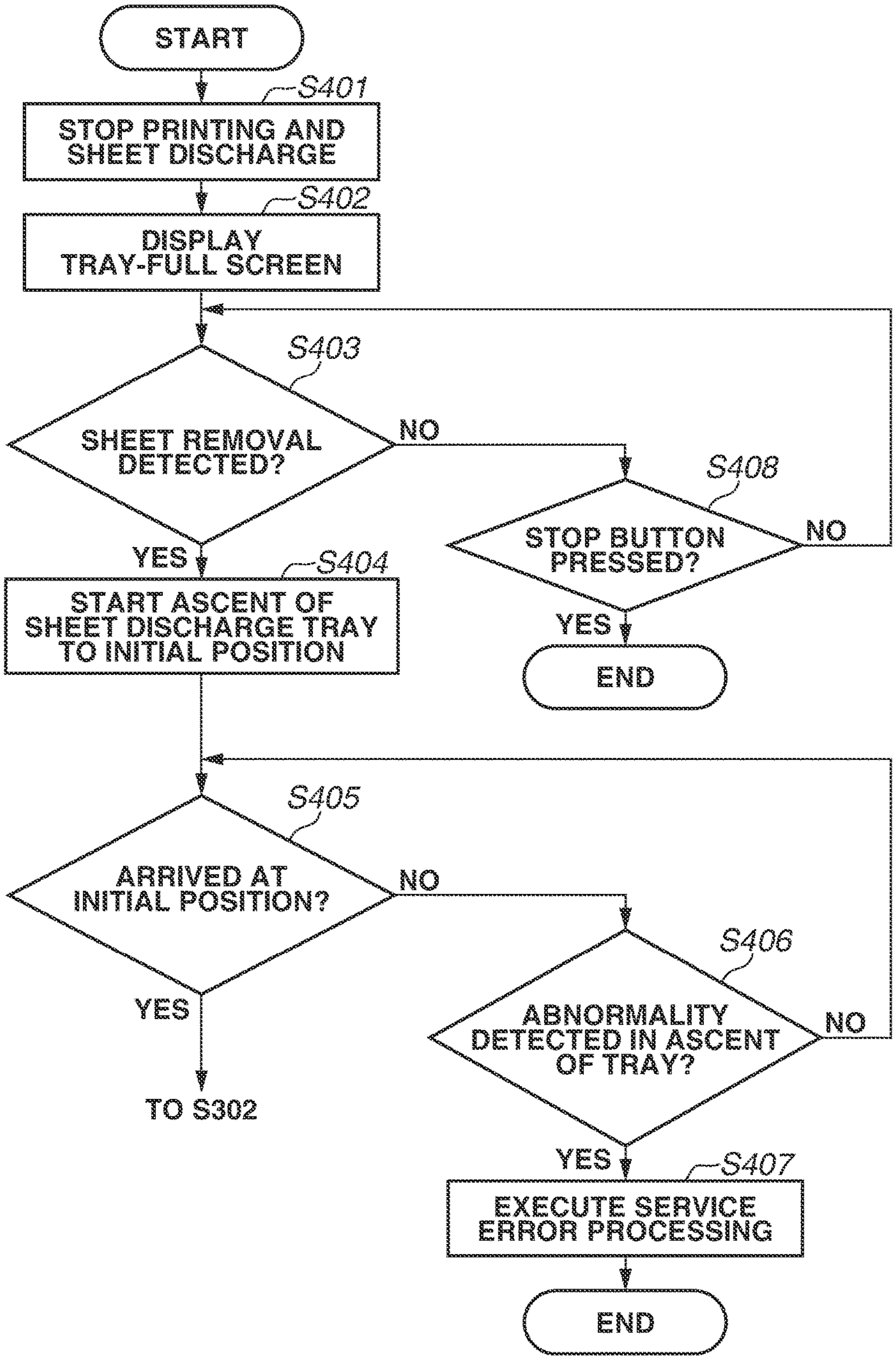
FIG. 4 is a flowchart illustrating the control method performed in the MFP.

FIG. 4 illustrates an example of processing to be executed when the CPU 102 determines that the stacking tray 233 has arrived at the lower end in step S303 illustrated in FIG. 3. In addition, each processing in the flowchart of FIG. 4 is implemented when the CPU 102 reads a program stored in the ROM 115 to the RAM 114 and executes the read program.

First, in step S401, the CPU 102 instructs the printer unit 108 to stop the print processing and the discharge operation. At this time, when there is a recording sheet remaining on the conveyance path, the CPU 102 stops the processing without discharging this recording sheet remaining on the conveyance path. In addition, the CPU 102 may perform control to stop new feeding of a sheet, while controlling the recording sheet remaining on the conveyance path to be discharged.

Next, in step S402, the CPU 102 controls the operation unit 104 to display a screen that displays arrival of the stacking tray 233 at the lower end. The screen also urges a user to remove the sheets on the stacking tray 233.

Figure 5:
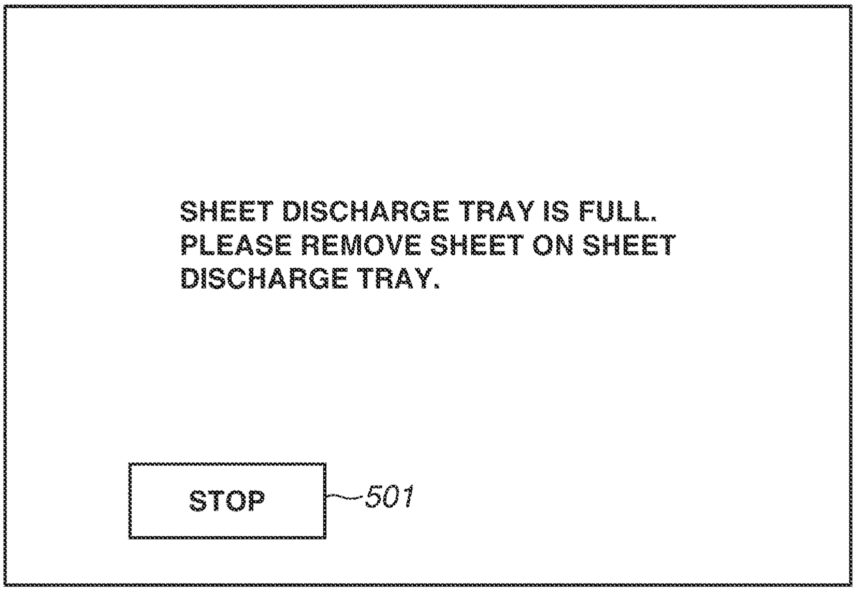
FIG. 5 is a diagram illustrating an example of a user interface (UI) screen displayed on an operation unit.

FIG. 5 is a diagram illustrating an example of the screen displayed on the operation unit 104 in step S402. This screen includes a message that requests the user to remove a recording sheet bundle discharged onto the stacking tray 233. In addition, a stop button 501 used to stop the print job is also displayed in this screen.

Next, in step S403, the CPU 102 determines, based on a signal from the sheet presence detection sensor, whether the recording sheets on the stacking tray 233 are removed. When the CPU 102 determines that the recording sheets are removed (Yes in step S403), the processing proceeds to step S404. In step S404, the CPU 102 causes the stacking tray 233 to start ascending by driving the elevating motor 235. On the other hand, when the CPU 102 determines that the recording sheets are not removed (No in step S403), the processing proceeds to step S408. In step S408, the CPU 102 determines whether the stop button 501 is pressed. When the CPU 102 determines that the stop button 501 is pressed (Yes in step S408), the CPU 102 cancels the job and ends the processing. On the other hand, when the CPU 102 determines that the stop button 501 is not pressed (No in step S408), the processing returns to step S403.

After the stacking tray 233 starts ascending in step S404, the processing proceeds to step S405. In step S405, the CPU 102 determines whether the stacking tray 233 has arrived at the initial position. When the CPU 102 determines that the stacking tray 233 has arrived at the initial position (Yes in step S405), the processing returns to step S302 in FIG. 3.

On the other hand, in step S406, the CPU 102 determines whether an abnormality is detected while the stacking tray 233 is ascending, before the stacking tray 233 arrives at the initial position. When the CPU 102 determines that the abnormality is detected (Yes in step S406), the processing proceeds to step S407. When the CPU 102 determines that the abnormality is not detected (No in step S406), the processing returns to step S405.

In step S407, the CPU 102 causes the operation unit 104 to display a screen urging the user to call a serviceperson, and then ends this processing.

Figure 6:
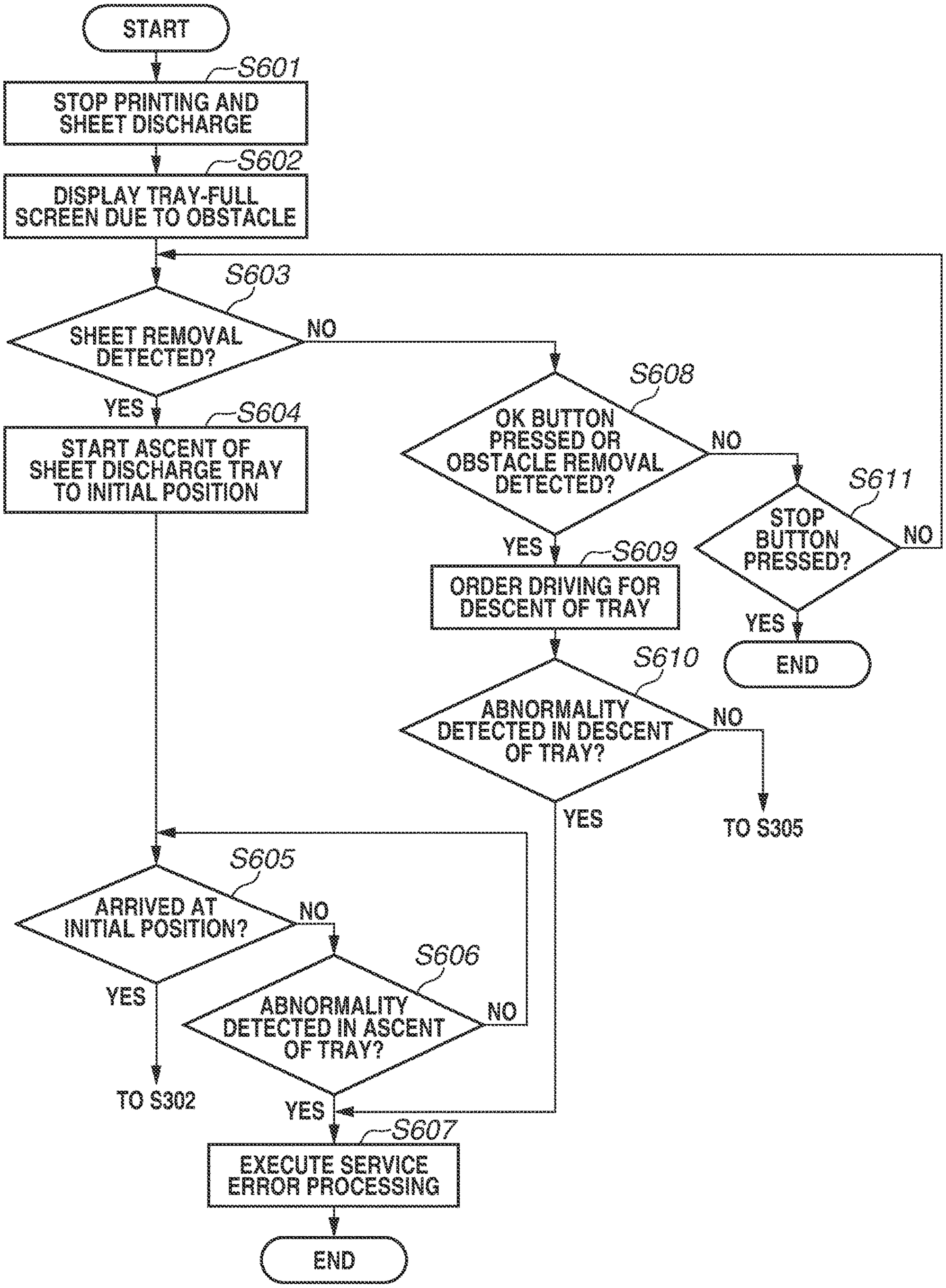
FIG. 6 is a flowchart illustrating the control method performed in the MFP.

FIG. 6 illustrates an example of processing to be executed when the CPU 102 determines that the obtained position of the stacking tray 233 is not the initial position in step S308 illustrated in FIG. 3. In addition, each processing in the flowchart of FIG. 6 is implemented when the CPU 102 reads a program stored in the ROM 115 to the RAM 114 and executes the read program.

First, in step S601, the CPU 102 instructs the printer unit 108 to stop the print processing and the discharge operation. At this time, when there is a recording sheet remaining on the conveyance path, the CPU 102 stops the processing without discharging the recording sheet remaining on the conveyance path. In addition, the CPU 102 may perform control to stop new feeding of a sheet, while controlling the recording sheet remaining on the conveyance path to be discharged.

Next, in step S602, the CPU 102 controls the operation unit 104 to display a screen that urges a user to remove the recording sheets on the stacking tray 233 or to remove the obstacle present under the stacking tray 233.

Figure 7:
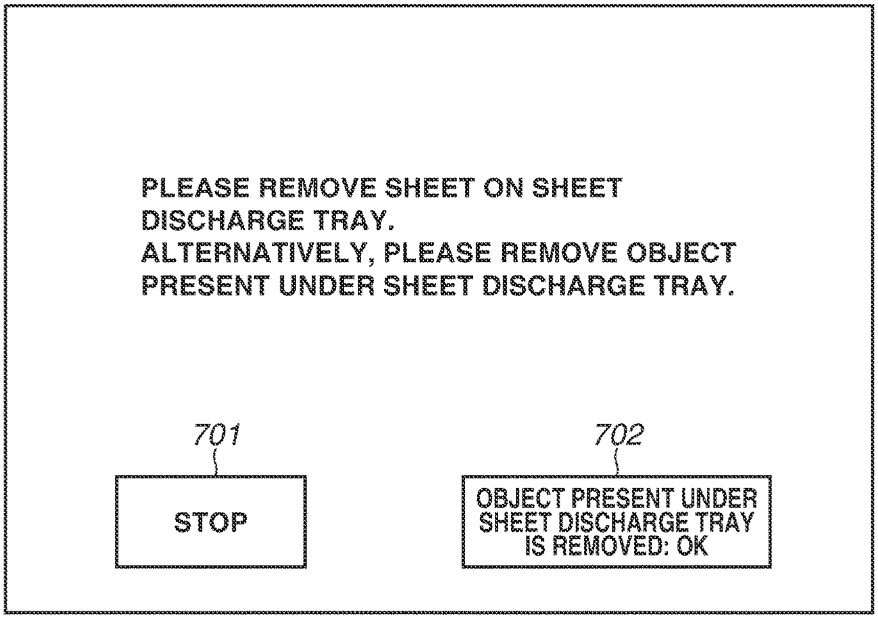
FIG. 7 is a diagram illustrating an example of a UI screen displayed on the operation unit.

FIG. 7 is a diagram illustrating an example of the screen displayed on the operation unit 104 in step S602. This screen includes a message that requests the user to remove the recording sheets on the stacking tray 233 or to remove the obstacle present under the stacking tray 233. Further, this screen includes a stop button 701 and a removal button 702. The removal button 702 is pressed by the user, after the obstacle present under the stacking tray 233 is removed. When the removal button 702 is pressed, the CPU 102 can confirm that the obstacle is removed.

In step S603, the CPU 102 determines, based on a signal from the sheet presence detection sensor, whether the recording sheets are removed from the stacking tray 233. When the CPU 102 determines that the recording sheets on the stacking tray 233 are not removed (No in step S603), the processing proceeds to step S608. On the other hand, when the CPU 102 determines that the recording sheets on the stacking tray 233 are removed (Yes in step S603), the processing proceeds to step S604. In step S604, the CPU 102 causes the stacking tray 233 to start ascending by driving the elevating motor 235. After the stacking tray 233 starts ascending in step S604, the CPU 102 determines whether the stacking tray 233 has arrived at the initial position in step S605. When the CPU 102 determines that the stacking tray 233 has arrived at the initial position (Yes in step S605), the processing returns to step S302.

On the other hand, in step S606, the CPU 102 determines whether an abnormality is detected while the stacking tray 233 is ascending, before the stacking tray 233 arrives at the initial position. When the CPU 102 determines that the abnormality is detected (Yes in step S606), the processing proceeds to step S607. When the CPU 102 determines that the abnormality is not detected (No in step S606), the processing returns to step S605.

In step S607, the CPU 102 causes the operation unit 104 to display a screen urging the user to call a serviceperson, and then ends this processing.

When the CPU 102 determines that the recording sheets on the stacking tray 233 are not removed in step S603 (No in step S603), the processing proceeds to step S608. In step S608, the CPU 102 determines whether the removal button 702 is pressed, or determines whether the obstacle is removed based on a signal from the obstacle detection sensor 238. Here, an example of performing both of these two kinds of determinations has been described. However, the MFP may perform only one of these two kinds of determinations.

When the CPU 102 determines that the removal button 702 is pressed or that the obstacle is removed based on the signal from the obstacle detection sensor 238 (Yes in step S608), the processing proceeds to step S609. On the other hand, when the CPU 102 determines that the removal button 702 is not pressed and that the obstacle is not removed based on the signal from the obstacle detection sensor 238 (No in step S608), the processing proceeds to step S611. When the processing proceeds to step S609, the CPU 102 causes the stacking tray 233 to start descending.

After the sheet discharge tray 233 starts descending, the processing proceeds to step S610. In step S610, the CPU 102 determines whether an abnormality is detected while the stacking tray 233 is descending. When the CPU 102 determines that the abnormality is detected (Yes in step S610), the processing proceeds to step S607. The CPU 102 then causes the operation unit 104 to display a service error. When the CPU 102 determines that the abnormality is not detected (No in step S610), the processing returns to step S305. The CPU 102 then continues the stacking operation of the recording sheets.

When the processing proceeds from step S608 to step S611, the CPU 102 determines in step S611 whether the stop button 701 is pressed. When determining that the stop button 701 is pressed (Yes in step S611), the CPU 102 cancels the job and ends the processing. On the other hand, when the stop button 701 is not pressed (No in step S611), the processing returns to step S603.

FIG. 8 illustrates an example of processing to be executed when the CPU 102 determines that the position of the stacking tray 233 is the initial position in step S308. In addition, each processing illustrated in the flowchart of FIG. 8 is implemented when the CPU 102 reads a program stored in the ROM 115 to the RAM 114 and executes the read program.

In step S801, the CPU 102 instructs the printer unit 108 to stop the print processing and the discharge operation. At this time, when there is a recording sheet remaining on the conveyance path, the CPU 102 stops the operation without discharging the recording sheet remaining on the conveyance path. In addition, the CPU 102 may perform control to stop new feeding of a sheet, while controlling the recording sheet remaining on the conveyance path to be discharged.

Next, in step S802, the CPU 102 controls the operation unit 104 to display a screen that requests the user to remove the obstacle present under the stacking tray 233.

Figure 9:
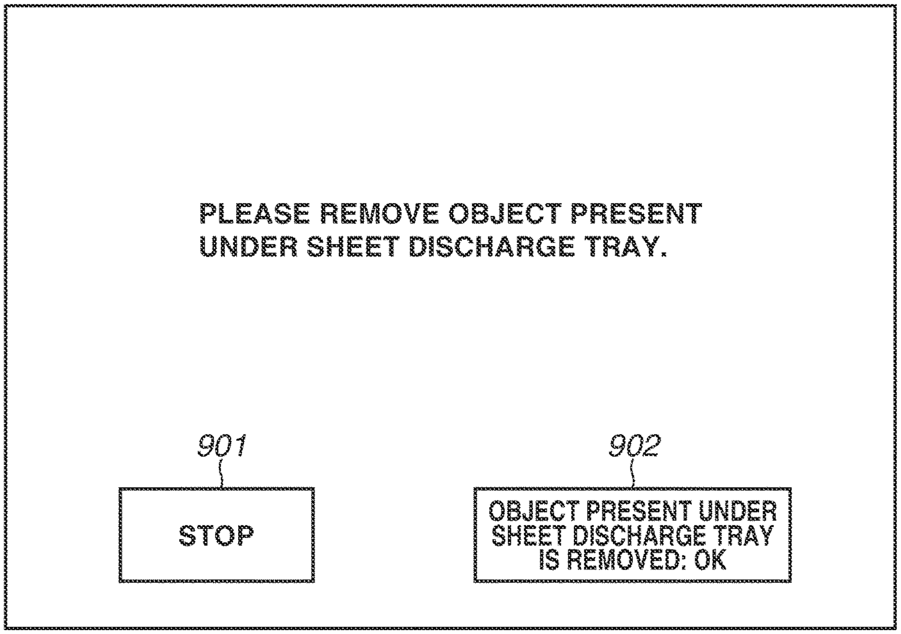
FIG. 9 is a diagram illustrating an example of a UI screen displayed on the operation unit.
Figure 10A:
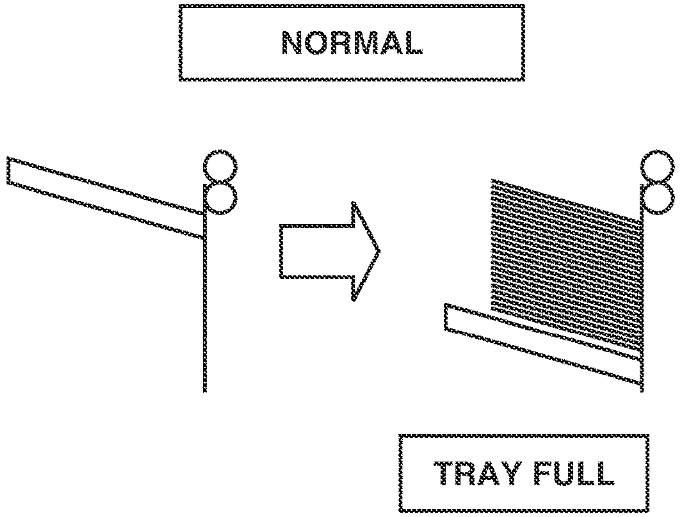
FIGS. 10A and 10B are diagrams illustrating a relationship between a sheet discharge tray and an obstacle.
Figure 10B:
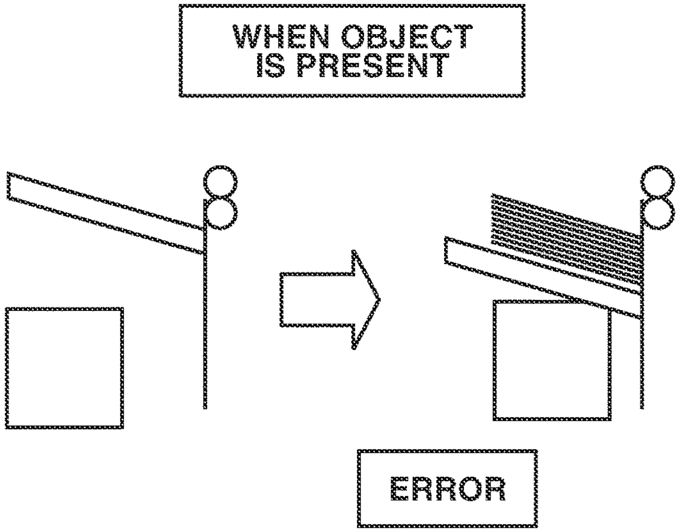

FIG. 9 is a diagram illustrating an example of the screen displayed on the operation unit 104 in step S802. This screen urges the user to remove the object present under the stacking tray 233. In addition, this screen includes a stop button 901 and a removal button 902.

In step S803, the CPU 102 determines whether the removal button 902 is pressed, or determines whether the obstacle is removed based on a signal from the obstacle detection sensor 238. Here, an example of performing both of these two kinds of determinations has been described. However, the MFP may perform only one of these two kinds of determinations.

When the CPU 102 determines that the removal button 902 is pressed or that the obstacle is removed based on the signal from the obstacle detection sensor 238 (Yes in step S803), the processing proceeds to step S804. On the other hand, when the CPU 102 determines that the removal button 902 is not pressed and that the obstacle is not removed based on the signal from the obstacle detection sensor 238 (No in step S803), the processing proceeds to step S807. In step S804, the CPU 102 causes the stacking tray 233 to start descending by driving the elevating motor 235.

In step S805, the CPU 102 determines whether an abnormality is detected while the stacking tray 233 is descending. When the CPU 102 determines that the abnormality is detected (Yes in step S805), the CPU 102 in step S806 causes the operation unit 104 to display a service error and ends the processing.

On the other hand, when the CPU 102 determines that the abnormality is not detected in step S805 (No in step S805), the processing returns to step S305. The CPU 102 then continues the stacking operation of the recording sheets.

On the other hand, when the processing proceeds from step S803 to step S807, the CPU 102 determines, in step S807, whether the stop button 901 is pressed. When the stop button 901 is pressed (Yes in step S807), the CPU 102 cancels the job and ends the processing. When the stop button 901 is not pressed (No in step S807), the processing returns to step S803.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus comprising:

an image forming unit configured to perform an image forming process for forming an image on a sheet;

a discharging unit configured to discharge the sheet having the image formed in the image forming process;

a tray on which the sheet discharged by the discharging unit is stacked;

a detecting unit configured to detect whether a sheet is on the tray;

a moving unit configured to cause the tray to ascend and descend, wherein the moving unit is capable of causing the tray to descend to a lower limit position according to an amount of sheets on the tray;

a determination unit configured to determine that descending of the tray by the moving unit is interrupted at a position located higher than the lower limit position; and a display unit configured to display a screen, wherein, in a case that the tray is located at the lower limit position, the display unit is configured to display a first screen prompting a removal of the sheets from the tray, and wherein, in a case that the descending of the tray is determined by the determination unit to be interrupted, the display unit is configured to display a second screen including both an information prompting a removal of the sheets from the tray and an information showing that an obstacle presents under the tray, the image forming unit stops the image forming process, and then the moving unit causes the tray to ascend in response to a detection result of the detection unit that the sheets are not on the tray and, after causing the tray to ascend, the image forming process of the image forming unit is resumed, even if the obstacle presents under the tray.

2. The image forming apparatus according to claim 1, wherein, in the case that the descending of the tray is determined by the determination unit to be interrupted, the image forming process of the image forming unit is resumed when the obstacle presenting under the tray is removed.

3. The image forming apparatus according to claim 1, wherein the second screen concurrently shows the information prompting the removal of the sheets from the tray and the information showing that an obstacle presents under the tray.

4. The image forming apparatus according to claim 1, wherein the tray is located at an initial partition in a state that no sheet is on the tray, and wherein, in a case where the descending of the tray is determined by the determination unit to be interrupted and the tray is located at the initial partition, the display unit displays a third screen showing that an obstacle presents under the tray.

5. The image forming apparatus according to claim 1, further comprising a detecting sensor configured to detect that the tray is at the lower limit position.

6. The image forming apparatus according to claim 1, further comprising a position detecting unit configured to detect a position of the tray, wherein the determination unit determines that descending of the tray by the moving unit is interrupted based on a detection result of the position detecting unit.

7. The image forming apparatus according to claim 1, further comprising a sheet detecting unit configured to detect an upper most sheet of the sheets on the tray, wherein the moving unit causes the tray to descend based on a detection result of the sheet detecting unit.

* * * * *